(12) United States Patent
Feng et al.

(10) Patent No.: US 8,615,670 B2
(45) Date of Patent: Dec. 24, 2013

(54) VOLTAGE IDENTIFICATION SIGNAL CONTROL DEVICE AND ELECTRONIC DEVICE EMPLOYING THE SAME

(75) Inventors: Lan-Yi Feng, Shenzhen (CN); Ying-Bin Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 380 days.

(21) Appl. No.: 13/040,301

(22) Filed: Mar. 4, 2011

(65) Prior Publication Data

US 2012/0137142 A1    May 31, 2012

(30) Foreign Application Priority Data

Nov. 30, 2010    (CN) .......................... 2010 1 0565823

(51) Int. Cl.
*G06F 1/32* (2006.01)
(52) U.S. Cl.
USPC ............. 713/321; 713/320; 713/340; 702/64

(58) Field of Classification Search
USPC ............................ 713/320, 321, 340; 702/64
See application file for complete search history.

(56) References Cited

U.S. PATENT DOCUMENTS

| | | | |
|---|---|---|---|
| 6,772,356 B1* | 8/2004 | Qureshi et al. ............... 713/321 |
| 8,291,242 B2* | 10/2012 | Chiu ............................ 713/300 |
| 2002/0147561 A1* | 10/2002 | Baracat et al. ................ 702/119 |
| 2004/0054936 A1* | 3/2004 | Dwyer et al. ................ 713/300 |

* cited by examiner

*Primary Examiner* — Thuan Du
(74) *Attorney, Agent, or Firm* — Altis Law Group, Inc.

(57) ABSTRACT

A voltage identification signal control device employed in an electronic device provides a voltage identification signal for a voltage regulation unit. The voltage identification signal control device includes an input unit and a processor. The input unit inputs and sets a predetermined voltage. The processor receives and converts the predetermined voltage from the input unit into a corresponding standard voltage identification signal, and transmits the voltage identification signal to the voltage regulation unit to activate the voltage regulation unit, and the voltage regulation unit outputs a corresponding operating voltage according to the voltage identification signal.

20 Claims, 2 Drawing Sheets

US 8,615,670 B2

VOLTAGE IDENTIFICATION SIGNAL CONTROL DEVICE AND ELECTRONIC DEVICE EMPLOYING THE SAME

BACKGROUND

1. Technical Field

The disclosure generally relates to voltage identification (VID), and more particularly to a VID signal control device and an electronic device employing the VID signal control device.

2. Description of the Related Art

Voltage regulation units (e.g., voltage regulators) of electronic devices, such as computers, are typically used to regulate and provide voltages for CPUs of the electronic devices. In practical use, the CPU directly transmits corresponding parallel VID signals to the voltage regulation unit, and the voltage regulation unit is then activated and provides voltage for the CPU.

However, the output voltages from the voltage regulation unit may be unstable and unsafe, which may damage the CPU. Moreover, most CPUs only use and transmit serial VID signals to the voltage regulation unit to set and regulate the output voltage.

Therefore, there is room for improvement within the art.

BRIEF DESCRIPTION OF THE DRAWINGS

Many aspects of an exemplary voltage identification signal control device and an electronic device employing the same can be better understood with reference to the following drawings. The components in the drawings are not necessarily drawn to scale, the emphasis instead being placed upon clearly illustrating the principles of the exemplary voltage identification signal control device and the electronic device employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
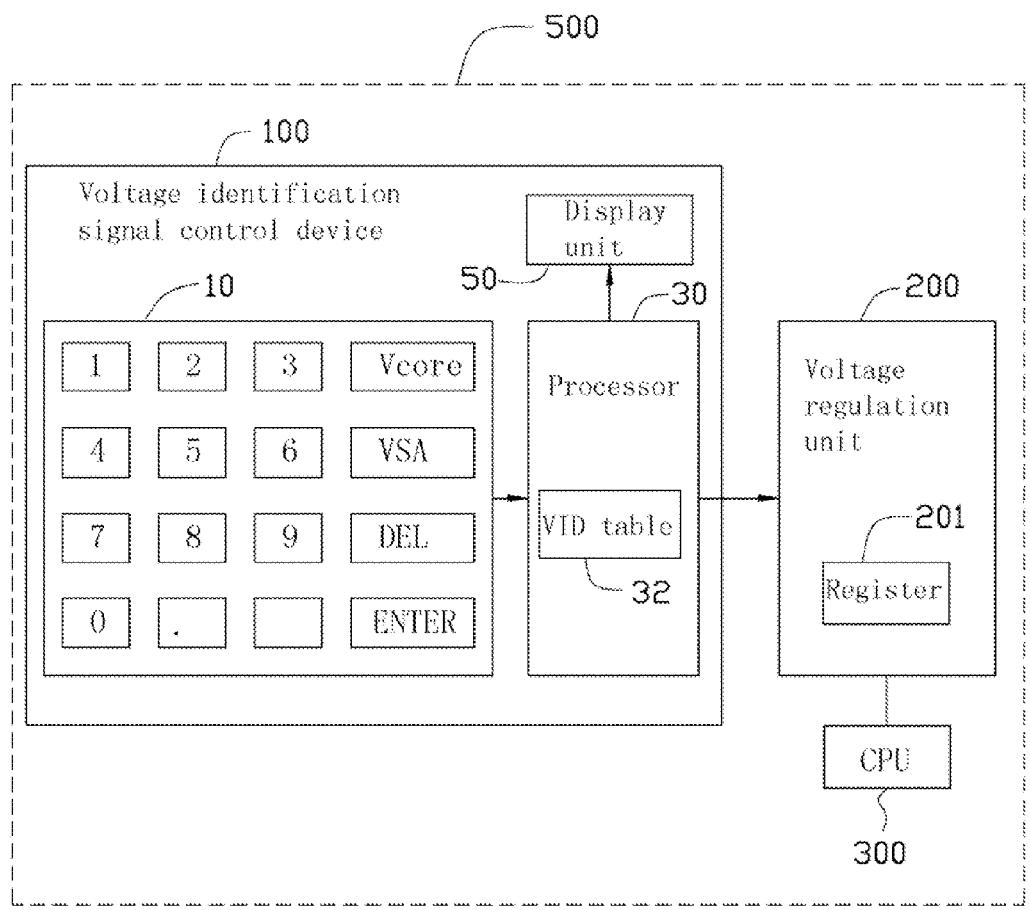
FIG. 1 is a block view of an electronic device including a voltage identification signal control device, according to an exemplary embodiment.

FIG. 1 shows an exemplary embodiment of an electronic device 500 including a voltage identification (VID) signal control device 100, a voltage regulation unit 200, and a central processing unit (CPU) 300. The VID signal control device 100 provides and outputs corresponding VID signals to the voltage regulation unit 200 to activate and enable the voltage regulation unit 200. The voltage regulation unit 200 then provides and outputs predetermined operating voltage to the CPU 300 to power, debug and test the CPU 300.

The VID signal control device 100 includes an input unit 10, a processor 30, and a display unit 50. The processor 30 is electrically connected to the input unit 10, the display unit 50, and the voltage regulation unit 200. The input unit 10 is capable of inputting and setting a predetermined voltage. The processor 30 receives and converts the predetermined voltage from the input unit 10 into a corresponding VID signal, and transmits the VID signal to the voltage regulation unit 200. The voltage regulation unit 200 is activated and outputs corresponding operating voltage according to the VID signal to power, test and debug the CPU 300. The display unit 50 is capable of displaying the input predetermined voltage and the operating voltage of the VID signal.

The input unit 10 can be a keyboard or touch panel, with keyboard used here as an example, which uses an arrangement of keys to act as mechanical or electronic switches. The input unit 10 sets and inputs the predetermined voltage to the processor 30, and includes a group of numeric keys, a group of function keys, and an enter key ENTER.

The group of numeric keys is capable of inputting and setting specific voltage and includes ten numeric keys 0-9 and a decimal key ".". The group of function keys includes a Vcore key, a Vsource key and a DEL key. The Vcore key and the Vsource key are used to respectively to select and output the VID signals of Vcore mode or the VID signals of Vsource mode. For example, when the Vcore key is operated, the Vcore mode is selected, making the voltage regulation unit 200 output Vcore mode voltage. When the Vsource key is operated, the Vsource mode is selected, the voltage regulation unit 200 accordingly outputs Vsource mode voltage. The DEL key is used to delete the input numbers.

For example, when the Vsource key is depressed, the Vsource mode is selected, inputting a number (e.g., 1.0000, 1.3111, or 1.5000), the corresponding predetermined voltage value is input in the input unit 10. When the ENTER key is depressed, the predetermined voltage is transmitted to the processor 30 and displayed on the display unit 50. The processor 30 converts the predetermined voltages into corresponding VID signals of Vsource mode.

The voltage regulation unit 200 can be a voltage regulator and includes a built-in register 201. The register 201 includes operating voltages corresponding to the input predetermined voltages. In detail, for example, when the register 201 receives a VID signal of Vcore mode or Vsource mode from the VID control 100, the voltage regulation unit 200 then outputs a corresponding operating voltage the Vcore mode or the Vsource mode to the CPU 300.

The processor 30 can be a single chip microcomputer (SCM) or a micro control unit (MCU), and communicates with the voltage regulation unit 200 through an inter-integrated circuit (I2C) bus. In this embodiment, the processor 30 can be an AT89s51 MCU and includes a VID table 32. The VID table 32 is capable of illustrating the relationship between VID signals and corresponding operating voltages. In detail, the processor 30 converts the predetermined voltage into corresponding VID signal in the range of 00000001-11111111. If the binary VID signal of the predetermined voltage exceeds the range, the processor 30 determines the binary VID signal as invalid data and stops transmission of the VID signal to the voltage regulation unit 200.

Figure 2:
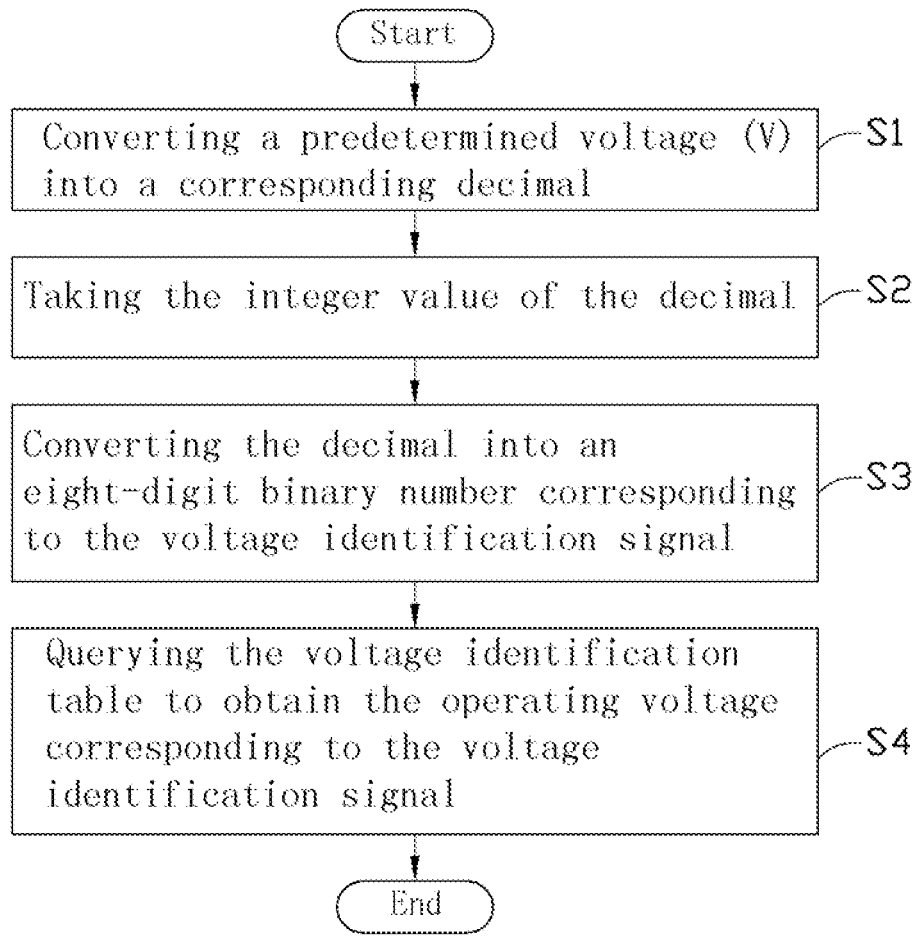
FIG. 2 is a flowchart for illustration of converting a predetermined voltage into a corresponding standard VID signal, according to an exemplary embodiment.

Referring to FIG. 2, in this exemplary embodiment, the processor 30 converts the predetermined voltage V into a corresponding standard VID signal as following steps.

Step S1: a corresponding decimal based on the formula of (V−0.25)/0.005+1 is obtained by the processor 30.

Step S2: the integer value of the decimal is determined according to the decimal by the processor 30.

Step S3: the decimal is converted into a corresponding 8-digit binary number which corresponds to the VID signal by the processor 30.

Step S4: the VID table 32 in the processor 30 is queried to determine and obtain the operating voltage Vout corresponding to the VID signal.

For example, if the predetermined voltage V=1.3111V, a corresponding decimal 213.22 is obtained by the formula of (V−0.25)/0.005+1, and the decimal 213.22 is converted to an integer value 213. The processor 30 then converts the integer 213 into 8-digit binary number 11010101. By querying the VID table 32, the binary number 11010101 corresponds to an operating voltage Vout of 1.31V. The binary number 11010101 is transmitted to the display unit 50 to display the operating voltage.

In this embodiment, the display unit 50 can be a digital display and is capable of displaying the input voltage of the input unit 10 and the converted operating voltage from the processor 30 according to the VID signal of Vcore mode or Vsource mode.

Referring to FIGS. 1 and 2, in use, when the Vcore key or the Vsource key is depressed, the corresponding mode is selected and set. The Vcore key or the Vsource key generates and transmits a trigger signal to the processor 30 to reset the display unit 50 and enable the voltage regulation unit 200 to output a corresponding operating voltage the Vcore mode or the Vsource mode. By inputting voltage value by the input unit 10, the input voltage is displayed on the display unit 50 for confirmation. When the ENTER key is depressed, the processor 30 receives and converts the input voltage into corresponding 8-digit VID signal of Vcore mode or Vsource mode, and the processor 30 determines whether the 8-digit VID signal is within the binary number range of 00000001-11111111 or not. If the VID signal exceeds the binary number range, the VID signal cannot be transmitted to the voltage regulation unit 200, or the VID signal is transmitted to the voltage regulation unit 200, and the operating voltage corresponding to the VID signal of Vcore mode or Vsource mode is displayed on the display unit 50 and is output to power the CPU 300.

In addition, the VID signal control device 100 can be built outside the electronic device 500, and is electrically connected to the voltage regulation unit 200 of the electronic device 500. Thus, the operating voltage of the voltage regulation unit 200 is predetermined by the VID signal control device 100 before the electronic device starts.

With the VID signal control device 100 and the electronic device 500 employing the same, the voltage regulation unit 200 can provide and output stable and safe operating voltages to power, test and debug the CPU 300. Moreover, the VID signal control device 100 has simple circuit connection and low cost, and it is convenient to test and monitor the voltage regulation unit 200.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A voltage identification signal control device used to provide a corresponding voltage identification signal for a voltage regulation unit, comprising:
   an input unit that inputs and sets a predetermined voltage, the input unit comprising a group of numeric keys, the predetermined voltage value input in the input unit by the group of numeric keys; and
   a processor electrically connected between the voltage regulation unit and the input unit, wherein the processor receives and converts the predetermined voltage from the input unit into a corresponding standard voltage identification signal, and transmits the voltage identification signal to the voltage regulation unit to activate the voltage regulation unit, and the voltage regulation unit outputs a corresponding operating voltage according to the voltage identification signal.

2. The voltage identification signal control device as claimed in claim 1, wherein the processor comprises a voltage identification table, the voltage identification table compares the voltage identification signals with the operating voltages.

3. The voltage identification signal control device as claimed in claim 2, wherein the processor converts the predetermined voltage into a corresponding voltage identification signal according to the following steps:
   converting the predetermined voltage value (V) into a corresponding decimal;
   taking the integer value of the decimal;
   converting the decimal into an eight-digit binary number corresponding to the voltage identification signal; and
   querying the voltage identification table to obtain the operating voltage corresponding to the voltage identification signal.

4. The voltage identification signal control device as claimed in claim 3, wherein the processor converts the predetermined voltage value (V) from the input unit to a corresponding decimal based on a formula of $(V-0.25)/0.005+1$.

5. The voltage identification signal control device as claimed in claim 1, wherein the processor determines whether the eight-digit binary number is within a binary number range or not, if the eight-digit binary number exceeds the binary number range, the voltage identification signal is not transmitted to the voltage regulation unit; if the eight-digit binary number is within the binary number range, the voltage identification signal is transmitted to the voltage regulation unit.

6. The voltage identification signal control device as claimed in claim 1, wherein the processor communicates with the voltage regulation unit through an inter-integrated circuit bus.

7. The voltage identification signal control device as claimed in claim 1, further comprising a display unit electrically connected to the processor, wherein the display unit is capable of displaying the input predetermined voltage from the input unit and the operating voltage.

8. The voltage identification signal control device as claimed in claim 1, wherein the input unit is a keyboard, which uses an arrangement of keys to act as mechanical or electronic switches.

9. The voltage identification signal control device as claimed in claim 8, wherein the group of numeric keys comprises ten numeric keys and a decimal key.

10. The voltage identification signal control device as claimed in claim 9, wherein the input unit further comprises a group of function keys, the group of function keys is capable of selecting and setting different modes of voltage identification signal to make the voltage regulation unit to output different mode of voltage.

11. An electronic device, comprising:
   a CPU;
   a voltage regulation unit electrically connected to the CPU, wherein the voltage regulation unit outputs and provides an operating voltage for the CPU; and
   a voltage identification signal control device electrically connected to the voltage regulation unit, the voltage identification signal control device comprising:
   an input unit that inputs and sets a predetermined voltage, the input unit comprising a group of numeric keys, the predetermined voltage value input in the input unit by the group of numeric keys; and
   a processor electrically connected between the voltage regulation unit and the input unit, wherein the processor receives and converts the predetermined voltage from the input unit into a corresponding voltage identification signal, and transmits the voltage identification signal to the voltage regulation unit, the voltage regulation unit is activated and outputs the corresponding operating voltage according to the voltage identification signal to power the CPU.

12. The electronic device as claimed in claim 11, wherein the processor comprises a voltage identification table, the voltage identification table compares the voltage identification signals with the operating voltages.

13. The electronic device as claimed in claim 12, wherein the processor converts the predetermined voltage into a corresponding voltage identification signal according to the following steps:
   converting the predetermined voltage value (V) into a corresponding decimal;
   taking the integer value of the decimal;
   converting the decimal into an eight-digit binary number corresponding to the voltage identification signal; and
   querying the voltage identification table to obtain the operating voltage corresponding to the voltage identification signal.

14. The electronic device as claimed in claim 13, wherein the processor converts the predetermined voltage value (V) from the input unit to a corresponding decimal based on a formula of (V−0.25)/0.005+1.

15. The electronic device as claimed in claim 11, wherein the processor determines whether the eight-digit binary number is within a binary number range or not, if the eight-digit binary number exceeds the binary number range, the voltage identification signal is not transmitted to the voltage regulation unit; if the eight-digit binary number is within the binary number range, the voltage identification signal is transmitted to the voltage regulation unit.

16. The electronic device as claimed in claim 11, wherein the voltage identification signal control device further comprises a display unit electrically connected to the processor, the display unit is capable of displaying the input predetermined voltage from the input unit and the operating voltage.

17. The electronic device as claimed in claim 11, wherein the input unit is a keyboard, the input unit further comprises a group of function keys, the group of numeric keys comprises ten numeric keys and a decimal key and is capable of inputting and setting the predetermined voltage values, the group of function keys is capable of selecting and setting different modes of voltage identification signal to make the voltage regulation unit output different mode of voltage.

18. A voltage identification signal control device, comprising:
   an input unit that inputs and sets different modes of predetermined voltages, the input unit comprising a group of numeric keys, the predetermined voltage value input in the input unit by the group of numeric keys; and
   a processor electrically connected between the input unit and a voltage regulation unit, wherein the processor receives and converts the different modes of predetermined voltages into corresponding voltage identification signals, and transmits the voltage identification signals to the voltage regulation unit, the voltage regulation unit is activated and outputs corresponding different modes of operating voltages corresponding to the voltage identification signals.

19. The voltage identification signal control device as claimed in claim 18, wherein the processor comprises a voltage identification table, the voltage identification table compares the voltage identification signals with the operating voltages.

20. The voltage identification signal control device as claimed in claim 19, wherein the processor converts the predetermined voltage into a corresponding voltage identification signal according to the following steps:
   converting the predetermined voltage value (V) into a corresponding decimal;
   taking the integer value of the decimal;
   converting the decimal into an eight-digit binary number corresponding to the voltage identification signal; and
   querying the voltage identification table to obtain the operating voltage corresponding to the voltage identification signal.

* * * * *